United States Patent [19]

Motoyama et al.

[11] Patent Number: 4,556,175
[45] Date of Patent: Dec. 3, 1985

[54] GRANULATING AND COATING MACHINE

[75] Inventors: Shimesu Motoyama, Asaka; Kaora Kurita, Ranzan; Shizuka Sakashita, Chiba; Narimichi Takei, Sugito; Shigeru Ohno, Kamakura, all of Japan

[73] Assignee: Freund Industrial Co., Ltd., Tokyo, Japan

[21] Appl. No.: 535,387

[22] Filed: Sep. 23, 1983

[30] Foreign Application Priority Data

Sep. 24, 1982 [JP] Japan .................. 57-167087
Nov. 22, 1982 [JP] Japan .................. 57-204836

[51] Int. Cl.$^4$ .............................................. B02C 23/26
[52] U.S. Cl. .................................... 241/57; 241/282.1; 366/107
[58] Field of Search .............. 241/5, 39, 40, 275, 241/42, 57, 101 B, 277, 282.1, 282.2; 34/57 A; 366/101–107; 422/228, 225

[56] References Cited

U.S. PATENT DOCUMENTS

| | | | |
|---|---|---|---|
| 3,179,378 | 4/1965 | Zenz et al. | 366/106 |
| 3,386,182 | 6/1968 | Lippert | 366/107 X |
| 3,913,847 | 10/1975 | Glatt et al. | 241/57 X |
| 4,002,323 | 1/1977 | Grun | 366/102 |
| 4,037,794 | 7/1977 | Melliger | 241/57 X |
| 4,197,660 | 4/1980 | Breitshaft et al. | 366/102 X |

FOREIGN PATENT DOCUMENTS

| | | | |
|---|---|---|---|
| 1220788 | 5/1960 | France | 366/107 |
| 22544 | 6/1971 | Japan . | |
| 47794 | 12/1972 | Japan . | |
| 62978 | 5/1975 | Japan . | |
| 133024 | 10/1981 | Japan . | |

Primary Examiner—Mark Rosenbaum
Attorney, Agent, or Firm—Kane, Dalsimer, Kane, Sullivan and Kurucz

[57] ABSTRACT

A granulating and coating machine for use in granulation, coating, mixing, drying etc. of powdery or granular materials. The machine includes a casing for holding the powdery or granular raw materials, a rotator for performing granulation or coating arranged at the bottom of the casing and formed with at least one ventilating porition, an annular slit formed between the periphery of the rotator and the inner wall of the casing. A gas flow adjusting mechanism including two separated ducts for gas flow is provided in order to control independently the rate of gas fed through the ventilating portion and the slit gas fed through the slit. An agitator for agitating the powdery or granular materials and a disintegrator for breaking undesirously large particles of the powdery or granular materials may be provided above the rotator. The slit may be formed by an annular slit forming ring mounted on the inner wall of the casing. The slit forming ring may be moved vertically by a slit adjusting mechanism to change the width of the slit so as to adjust the rate of flow of the slit gas fed through the slit.

13 Claims, 17 Drawing Figures

GRANULATING AND COATING MACHINE

BACKGROUND OF THE INVENTION

1. Field of the Invention

This invention relates to a granulating and coating machine, more particularly to a granulating and coating machine which is capable of granulating, coating, mixing, and drying granular and powdery raw materials with high productivity.

2. Prior Art

Granulation is one of the most useful way of processing products from the pharmaceutical industry and some others, too. But it has long been the most difficult process. In order to perform granulation, many trials were made and traditional methods were developed. However, each unit process requires different unit equipment. Of course, skilled workers were also required in each unit process. Thus, the traditional granulation is very low in productivity, very difficult in technology and not suitable for GMP (Good Manufacturing Practice).

Some decade ago, the fluidized bed granulation method was developed as a quite new process. This method excludes wetting/kneading, cutting and tumbling, though it includes mixing and drying. A single piece of equipment, the fluidized bed granulator, is required, but nothing more. It is suitable for GMP.

While raw material powders are fluidized by an air stream in this equipment, they are sprayed by a binder solution. The particles receiving droplets of the solution agglomerate with others and enlarge their size. At the same time, the agglomerated particles are dried by the air stream for fluidization. Since the air required for fluidization is far more than the air for drying, the enlarged particles are dried almost instantaneously.

Fluidized bed granulation seemed to be a perfect method. However, it has big disadvantages in technique and in quality of the product. Fluidization is performed by virtue of the balance of lifting force of air and gravity on the particles. The balance easily tends to be loosen especially the particles' size, shape and weight are changed during fluidization. This is the basic difficulty of fluidized bed granulation. Furthermore, the concentration of particles should be lowered to avoid any interaction between them and keep a good fluidizing state. But it makes the space yield of fluidization granulation very low. Qualitywise, enlarged particles obtained by this method are generally very bulky, coarse and brittle, due to the lack of kneading and tumbling.

In the prior art, there were provided many types of machines for granulating, coating, mixing, and drying granular and powdery materials for use in the fields of medicine, foods, powdered metals, catalyst, ferrite, ceramics, detergent, cosmetics, dyestuff, pigment, toner, etc.

As one example of such prior machines, there was provided a machine which had a mesh at the bottom of a granulating casing and rotary blades mounted over the mesh. This prior machine, however, was not suitable for granulation and coating, because the granulated materials were disintegrated by the rotary blades and the mesh to make it impossible to obtain spherical products. In addition, the coated film was flawed.

There is disclosed another prior machine having a rotary plate or disk over a mesh provided at the bottom of a granulating casing, this is shown in the Japanese Patent Laid-open Publications Nos. 54-62978 nd 56-133024. This prior art device can be used for granulation and coating, but it has a drawback in that the granulated materials are caught between the rotary disk and the mesh so as to be disintegrated by being rubbed against the mesh when the rotary disk is rotated. In this prior art, another drawback that should be mentioned is that the powdery materials are leaked through the mesh. In addition to these drawbacks, this prior art can not control the bulk density of the granulated materials, as the result of this, it is able to granulate only heavy products with irregular particle size. Further, the prior art machine has another defect in that the productivity of the prior machine is low.

In the Japanese Patent Publications Nos. 46-22544 and 47-47794, there is disclosed a coating machine wherein the bottom wall of the casing is formed by a rotary disk, and coating is performed by the centrifugal tumbling obtained by the rotation of the rotary disk and the air introduced through the slit formed between the outer periphery of the rotary disk and the inner wall of the casing. This prior machine is, however, constructed mainly for coating, and when it is used for granulation, the productivity is low because of less drying capacity and blocking of granules. Therefore, this prior art is unsuitable for mass granulation. Further, this prior art produces only heavy spherical products, but does not produce light products.

SUMMARY OF THE INVENTION

It is an object of the present invention to provide a granulating and coating machine, which can control the bulk density, hardness, and particle size etc. of the granulated products, and can obtain, with high productivity, the granulated products of high quality without segregation and which are not disintegrated easily.

It is another object of the present invention to provide a granulating and coating machine, which can control the width of an air slit by a simple and low cost structure and by and easy operation.

In order to perform the above objects, the granulating and coating machine of the present invention includes gas flow rate control means which control independently the gas flow through a ventilating portion formed in a rotator for granulation and coating, and the gas flow through a slit formed between the outer periphery of the rotator and the inner wall of the granulating casing, (slit gas). This machine can perform granulation, coating, mixing, drying etc. always at the optimum conditions by controlling these two gas flows independently.

According to another characteristic of the present invention, the width of the slit can be adjusted by the vertical (up and down) movement of the rotator or an annular slit forming means. The vertical movement of the slit forming means may be performed easily by the operation of the slit control means only.

Furthermore, the granulating and coating machine of the present invention may be provided with an agitator above the rotator so as to agitate the materials to be granulated or coated by rotating the agitator in a direction and at a speed independent from those of the rotator. Further, a disintegrator may be provided above the rotator in order to break the large sized granulated or coated materials.

BRIEF DESCRIPTION OF THE DRAWINGS

Other objects and advantages of the present invention will become apparent from the following detailed description taken in conjunction with preferred embodiments shown in the accompanying drawings, in which.

DETAILED DESCRIPTION OF THE PREFERRED EMBODIMENTS

Figure 1:
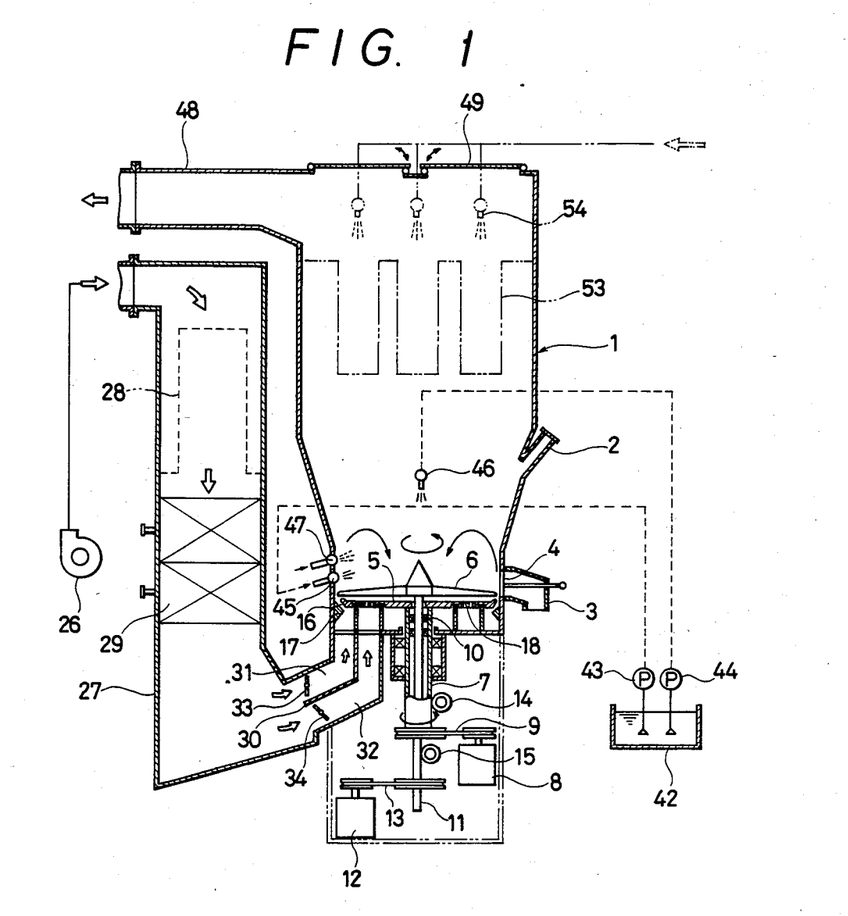
FIG. 1 is a general sectional view of the granulating and coating machine according to one embodiment of the present invention.

Referring now to the drawings, FIG. 1 shows a general partial sectional view of one embodiment of the granulating and coating machine in accordance with the present invention.

The granulating and coating machine of this embodiment has a granulating chamber or casing 1 for fluidizing or granulating or coating powdery or granular raw materials charged into the casing 1. This casing 1 is arranged in the upright direction and has a substantially cylindrical shape. The side wall of the casing 1 is provided with a chute 2 slanted outwardly for feeding the materials to be granulated or coated at the intermediate height thereof. The side wall of the bottom portion of the casing 1 has a discharge chute 3 for discharging the granulated or coated products and a discharge valve 4 for opening and closing the discharge opening.

At the inside of the bottom portion of the casing 1, at substantially the same level as the discharge chute 3, there is provided a rotator or rotary disk 5 for tumbling and outwardly moving the powdery or granular raw materials by rotating substantially horizontally in the casing 1. An agitator 6 for mixing and accelerating movement of the powdery or granular materials being granulated or coated is provided above the rotary disk 5 to be rotated in the substantially horizontal plane.

The rotary disk 5 is rotated by driving a hollow rotary shaft 7 provided vertically at the center of the granulating chamber 1 in the desired direction via a belt 9 from a driving motor 8 of the variable speed type.

The agitator 6 is rotated in the direction and at the speed independent from those of the rotary disk 5, by rotating a rotary shaft 11, inserted coaxially into the hollow rotary shaft 7 and supported by bearings 10, via a belt 13 from another driving motor 12 of the variable speed type.

The rotary disk 5 and agitator 6 are moved in the vertical direction respectively and independently by each of the different lift mechanisms 14 or 15. These lift mechanisms 14, 15 may be, for example, of the worm and rack type.

The lift mechanism 14 can adjust the clearance or width of an annular gap or slit 16 between the outer periphery of the rotary disk 5 and the inner wall of the casing 1, for example, in the range from 0 to ten-odd millimeters by moving the rotary disk 5 upwardly or downwardly so as to make it possible to control the flow rate of a gas, for example, heated or cooled air, blown into the inside of the casing 1 through the slit 16 from the lower side of the rotary disk 5, so as to keep the flow at an optimum state according to any steps of the granulating or coating operations etc.

Figure 2:
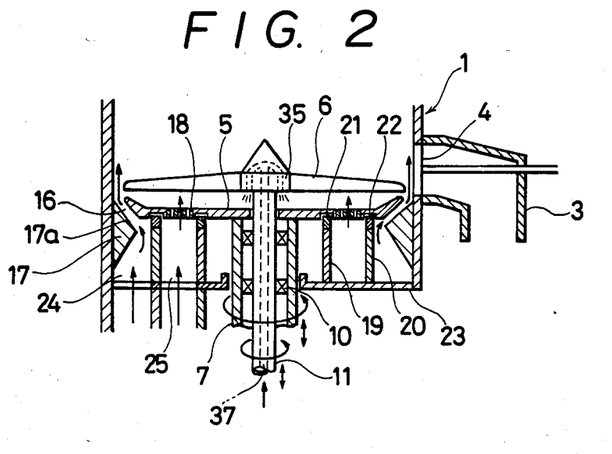
FIG. 2 is an enlarged partial sectional view of the major part of the machine of FIG. 1.

In order to adjust the flow rate of the slit gas, as shown most clearly in FIG. 2, an annular ring 17 of triangular sectional shape is provided on the inner wall of the casing 1 at a position adjacent to the outer periphery of the rotary disk 5. The width of the slit 16 formed between the upwardly expanded slit forming surface 17a of the annular slit forming ring 17 and the outer periphery of the rotary disk 5 is adjusted by moving the rotary disk 5 upwardly or downwardly by means of the lift mechanism 14. In another way, the width or gap of the slit 16 may be adjusted by changing the vertical position of the annular ring 17.

Figure 3:
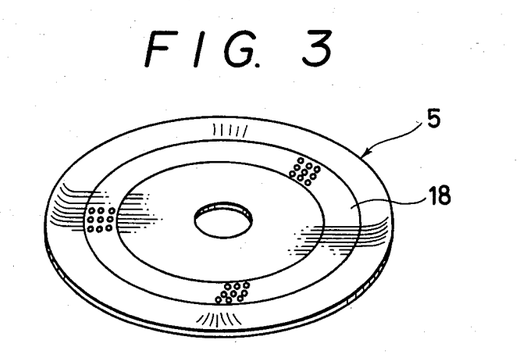
FIG. 3 is a perspective view showing one embodiment of a rotary plate or disk in accordance with the present invention.

As shown in FIG. 3, the rotary disk 5 of this embodiment has a ventilating portion 18 defined by a ring or circumferential perforated plate positioned slightly outside of the intermediate portion of the radial dimension thereof. This ventilating portion 18 may be made of a sintered plate having a small hole which can prevent powdery or granular material from dropping off therethrough, a mesh etc. The position of the ventilating portion 18 is preferably outside of the intermediate portion of the radial dimension of the rotary disk 5 in order to promote sufficient centrifugal tumbling action of the powdery or granular materials on the rotary disk 5. The ventilating portion 18 may be provided in other than circumferential direction, for example, it is possible to provide the ventilating portion 18 as radial notches at any position of the rotary disk.

The purpose for which the ventilating portion 18 is provided is to produce a flow pattern of the powdery or granular materials in the casing 1 different from the flow pattern produced by the slit gas fed through the slit 16 in order to efficiently manufacture granulated or coated products of superior quality including, for example, low segregation and wide ranged bulk density. This may be accomplished by blowing gas, for example, heated or cooled air into the casing 1 through the ventilating portion 18 from the lower side of the rotary disk 5. This gas flow through the ventilating portion 18 is independent from the slit gas flow through the slit 16.

To obtain these two different gas flows, there are provided annular partition walls 19, 20 on bottom wall 23. Each of these partition walls 19, 20 has a seal ring 21 or 22 of labyrinth type at the upper end respectively; These seal rings 21, 22 are inserted into grooves formed on the lower surface of the rotary disk 5. By means of these annular partition walls 19 and 20, each of two gas passages 24 and 25 is formed for the slit gas blown into the casing 1 through the slit 16 and the gas blown into the casing 1 through the ventilating portion 18 respectively, and these gas passages 24, 25 are separated from each other to form different gas feeder lines.

The slit gas through the slit 16 and the gas through the ventilating portion 18 are at first fed in common with each other from a feeder fan 26 shown in FIG. 1, then cleaned by passing through a filter 28 in a feeder duct 27, and after being heated or cooled to the desired temperature by a heat exchanger 29, fed to the bottom portion of the feeder duct 27. The gas feeder line from the bottom portion of the feeder duct 27 to the bottom portion of the casing 1 is separated to form a slit gas passage 31 and a gas passage 32 to the ventilating portion 18 by means of a partition wall 30 connected to the annular partition wall 20 of the gas passages 24 and 25. Each of the slit gas passage 31 and the gas passage 32 is communicated with each of the slit gas passage 24 and the gas passage 25 to form two independent gas feeder lines, one is led to the slit 16 and the other is led to the ventilating portion 18.

In the vicinity of the entrance of each gas passage 31, 32, there are provided a control valve or damper 33 for regulating the flow rate of the slit gas fed to the slit 16, and a control valve 34 for regulating the flow rate of the gas fed to the ventilating portion 18. By adjusting these flow rate control valves 33 and 34 independently, it is possible to obtain various flow patterns formed by these two gas flows blown into the casing 1 through the slit 16 or the ventilating portion 18.

Figure 4:
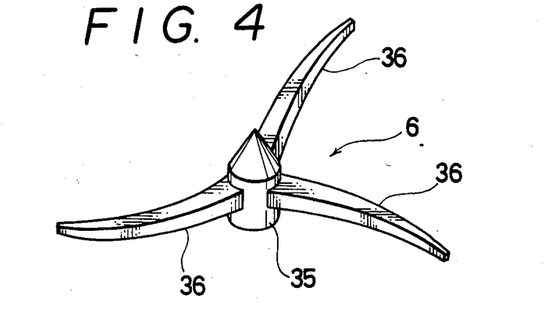
FIG. 4 is a perspective view showing one embodiment of an agitator in accordance with the present invention.

The agitator 6 of this embodiment, as shown in FIG. 4, has three agitating blades 36 at the side of a boss 35 each of the blades 36 is curved-nail like in shape and arranged to extend at an angle of 120 degrees with each other so as to increase the mixing and granulating effects. As shown in broken line in FIG. 2, the agitator 6 is designed to blow out from the lower side of the boss 35, purge gas fed through gas passage 37 formed in the rotary shaft 11. The purge gas is to prevent the powdery or granular materials from entering into the gap formed between the rotary shaft 11 and the rotary disk 5.

At the side wall of the casing 1 near the bottom portion thereof just above the agitator 6 and above the agitator 6 about center of the casing 1, there are provided two spray nozzles 45 and 46 respectively of two-fluid type for spraying a coating or binder solution fed from a liquid tank 42 by each of pumps 43 and 44.

On the other hand, at the side wall of the casing 1 just above the spray nozzle 45, a nozzle 47 for feeding the powdery or granular materials into the fluidized or granulated bed in the casing 1.

Furthermore, at the top portion of the inside of the granulating casing 1, a bag filter 53, and jet nozzles 54 for intermittently blowing off the materials and dust etc. collected by the bag filter 53 by applying pulse jet of high pressure gas. An exhaust duct 48 for discharging the exhaust air from the fluidized bed granulating chamber out of the system via the bag filter 53 is connected to the side of the top portion of the casing 1. Covers 49 for explosion venting are hinged to the top wall of the casing 1.

Alternatively, the bag filter 53 and jet nozzle 54 may be omitted or a cyclone may be used in place of them.

The operation of this embodiment is described in the following.

At first, a predetermined volume of the powdery or granular materials to be granulated or coated are fed into the granulating casing 1 via the chute 2.

The gas flow control valve 34 is opened to adjust the gas flow rate through duct 32 independently to allow the gas from the feeder fan 26 to blow into the casing 1 through the ventilating portion 18 of the rotary disk 5.

The vertical position of the rotary disk 5 is set at a predetermined level by adjusting or controlling the lift mechanism 14 in order to open the slit 16 formed between the outer periphery of the rotary disk 5 and the inclined surface 17a of the annular ring 17 mounted on the inner wall of the casing 1. Additionally, the vertical position of the agitator 6 is adjusted to a predetermined level by controlling the lift mechanism 15. In this condition, the rotary disk 5 is rotated by driving the motor 8 and the agitator is rotated by driving the motor 12.

After that, the agitator 6 is rotated by the driving motor 12 via the belt 13 and the rotary shaft 11 in the same or reverse direction from that of the rotary disk 5 in order to agitate the materials being granulated or coated. Immediately after feeding the powdery or granular materials, a binder or coating solution fed from the liquid tank 42 by the pumps 43 or 44 is sprayed onto the materials to be granulated or coated through the spray nozzles 45 and/or 46. If desired, the solid or powdery granulating or coating materials may be fed onto the materials to be granulated or coated from the nozzle 47. The exhaust gas from the casing 1 is discharged out of the system via the bag filter 53 by the exhaust duct 48. To help exhausting the gas, another fan may be set downstreamly.

In the granulating and coating machine according to this embodiment, by the combination of the slit gas through the slit 16 and the gas through the ventilating portion 18, in addition to the combined rotational motion of the rotary disk 5 and the agitator 6, the materials being granulated or coated are subjected to the centrifugal tumbling and agitating and are fluidized in the circulative flow pattern in which the materials are blown up by the gas flow and come down by the gravity. Therefore, in this embodiment, particles move well don't make any dead space and can avoid channelling and bubbling, to granulate or coat products which have optimum bulk density, hardness and particle size etc. in correspondence to the use and purpose etc. of the products. In other words, according to this embodiment, it is possible to granulate or coat a variety of products, namely from soft and light products to hard and heavy products with low cost and high productivity, and to perform coating not only of the spherical granules, but also of the piller pellets and crystalline powder etc. satisfactorily.

The granulated or coated products are discharged rapidly and easily from the discharge chute 3 by means of the combined rotational motion of the rotary disk 5 and agitator 6.

In this embodiment, as a result that the rotational direction and speed of the rotary disk 5 and the agitator 6, and the rate of flow of the two gas flows may be controlled variably, it is possible, in addition to obtaining high productivity, to change the properties of the products such as bulk density, particle size, shape etc. selectively in a wide range as desired.

As a first example, in case the rotational speed of the rotary disk 5 is low and the rotary disk 5 and the agitator 6 are rotated in the same direction with each other, and the rate of flow of the gas through the ventilating portion 18 of the rotary disk 5 is large and the rate of flow of the slit gas through the slit 16 is small, then the materials to be granulated or coated are fluidized in the flow pattern wherein the materials are blown up from the center of the casing 1 and dropped toward the radially outside by the gravity to obtain softly granulated products having low bulk density.

As a second example, in case the agitator 6 is rotated in the same direction as the rotary disk 5, but the rotational speed of the former is faster than the latter, and the rate of flow of the gas through the ventilating portion 18 is small and the rate of flow of the slit gas is large, then the materials to be granulated or coated are fluidized in the flow pattern wherein the materials are blown up along the inner wall of the casing 1 and dropped toward the center of the casing 1 to produce spherical and hard products having high bulk density and to obtain high granulating speed or productivity by the large centrifugal force of the agitator 6.

As a third example, in case the rotational speed of the rotary disk 5 and the agitator 6, the rate of flow of the gas through the ventilating portion 18, and the rate of flow of the slit gas are selected between those of the above first and second examples, it is possible to obtain products having bulk densities and hardness between those of the above first and second examples.

As a fourth example, in case the rotary disk 5 and the agitator 6 are rotated in the reverse directions from each other, and the rate of flow of the slit gas is large and the rate of flow of the gas through the ventilating portion 18 is small, the materials to be granulated or coated are fluidized in a centrifugal fluidization pattern wherein the materials are urged against the inner wall of the casing 1 to obtain hard and spherical granulated products having high bulk density.

Further, although this embodiment is capable of granulating and coating at other conditions than those selected in the above examples, this embodiment can be applied to a variety of granulating or coating operations including aggregation granulation, centrifugal tumbling granulation and mixing etc.

Moreover, with this embodiment, it is possible to do humidification and mixing of the granular or powdery materials before the granulating or coating operations thereof. This humidification and mixing operation is performed by spraying binder or coating liquid from the spray nozzle 46 above the granulating and coating bed before granulating or coating operations in the amount corresponding to several percent of the volume of the materials to be granulated or coated. At that time, the rotary disk 5 is descended to close the slit 16 and is not rotated while the agitator 6 is rotated at high speed. By this humidification and mixing operation, the surface of the powdery or granular materials becomes wet, as a result of which the speed of granulation or coating during the granulating or coating operations thereafter is accelerated. Also, as it becomes possible to reduce the amount of fine powder scattered and lost from granulated or coated bed, the ingredients of the granulated products become more uniform. Therefore, it may be unnecessary to provide a bag filter in the casing, and granulating and coating machines with low cost and high productivity can be obtained by providing a simple cyclone (not shown) outside of the casing 1 in place of a bag filter to recycle the powdery or granular materials collected in the cyclone.

Further, in the case of the powdery or granular materials which have high specific gravity, (for example, ceramics, powdered metals, or ferrite etc.), it is impossible to restart prior art machine once the fluidized state is broken for some reasons. On the contrary, in this embodiment, it is possible to restart the fluidizing easily in such a case, simply by rotating agitator 6 together the rotary disk 5.

Figure 5:
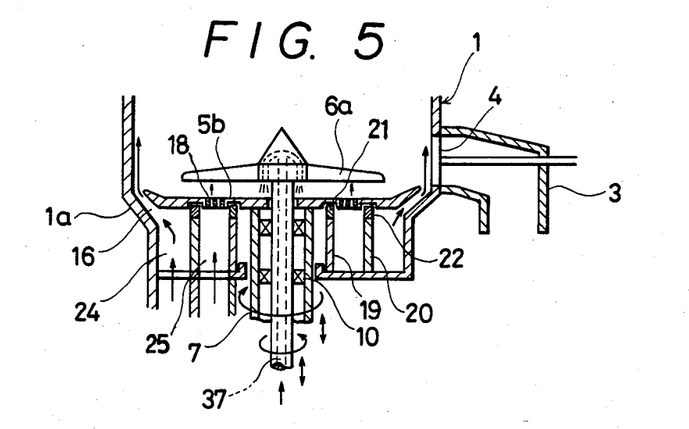
FIG. 5 is an enlarged partial sectional view showing the major portion of another embodiment of the present invention.

FIG. 5 is a partial sectional view showing another embodiment of the granulating and coating machine in accordance with the present invention.

In this embodiment, the side wall of the casing 1 in the vicinity of the periphery of the rotary disk 5b is formed as an inclined surface 1a which is expanded upwardly. Therefore, the width of the slit 16 can be adjusted variably as desired, by moving the rotary disk 5b vertically by means of the lift mechanism 14. The agitator 6a of this embodiment has a diameter smaller than that of the rotary disk 5b.

In the embodiment shown in FIG. 5, it is possible to granulate or coat the products with superior quality and with high productivity by means of the combined rotational motion of the rotary disk 5b and agitator 6a and the slit gas fed through the slit 16 and the gas fed through the ventilating portion 18.

The side wall of the casing 1 which forms the slit 16 between the outer periphery of the rotary disk 5b and the side wall itself may be expanded upwardly in a reverse direction to the inclined surface 1a. This is the same as the case of the annular ring 17 in the above described embodiment.

FIGS. 6–9 are perspective views showing several embodiments of the agitator used in the present invention.

Figure 6:
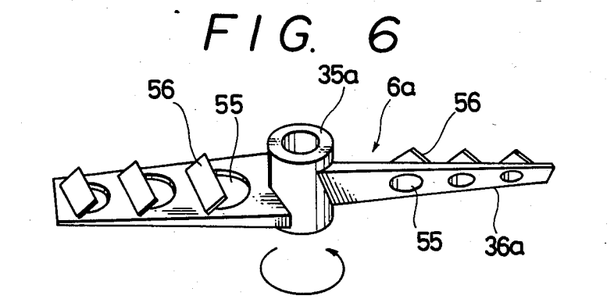
FIGS. 6–9 are perspective views showing other embodiments of the agitator respectively.

In the embodiment shown in FIG. 6, the agitator 6a has two agitating blades 36a extending from opposite the sides of the boss 35. These agitating blades 36a have a plurality of vent holes 55 and agitating plates 56 provided in the lateral direction relative to the length of the blades 36a between the vent holes 55. The embodiment shown in FIG. 6 is suitable where it is desired to increase the rate of flow of the gas fed through the ventilating portion 18, is suitable for the granulating operation wherein the density of the powdery and granular materials is high and the amount of the binder solution is large etc., and can obtain excellent dehydrating and drying effects on the granulated or coated products.

Figure 7:
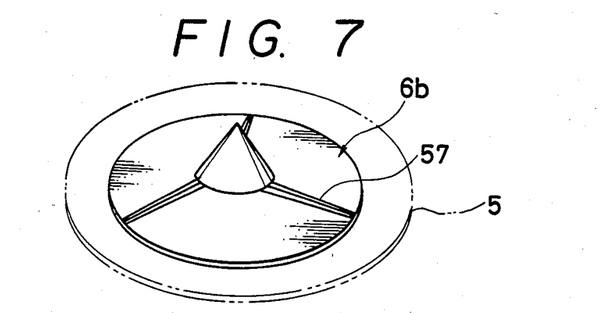

The embodiment depicted in FIG. 7 shows an agitating blade 6b; On the upper surface if plate 6b there are provided three linear projections or baffles 57 arranged radially at angles of 120 degrees with each other. This agitating blade 6b may have a diameter smaller than that of the rotary disk 5 shown in phantom line in FIG. 7, or may have a diameter substantially equal to that of the rotary disk 5. This embodiment is suitable where powdery material and a binder solution are added to seed granules as core substances to produce spherical granules and can perform tumbling granulation efficiently.

Figure 8:
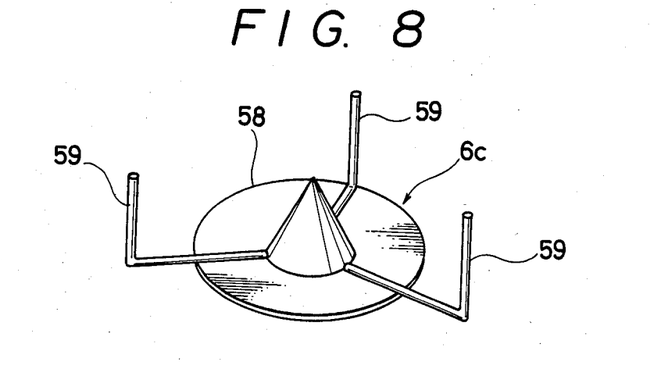

In the embodiment shown in FIG. 8, an agitating blade 6c includes a disk portion 58 having a slightly small diameter, and scrapers 59 of substantially L shaped configurations. The upright portions of the scrapers 59 are arranged at angles of 120 degrees with each other to scrape the powdery or granular materials stuck on the inner surface of the side wall of the casing 1. Therefore, this embodiment is suitable for the tumbling granulation of the materials that tend to stick to the wall.

Figure 9:
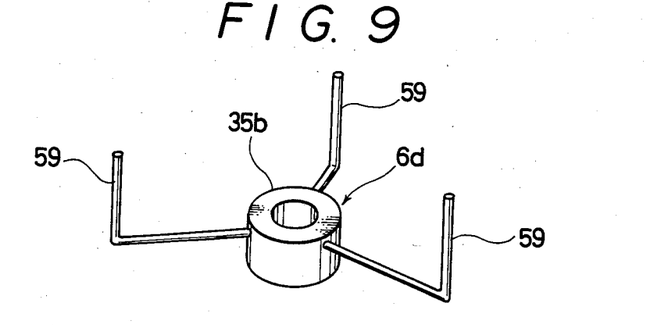

In the agitator 6d shown in FIG. 9, the scrapers 59 are attached to the side of a boss 35b rather than a disk.

The present invention is not limited to the embodiments described above, many other modifications may be made easily. For example, a polygonal rotator may be used in place of the rotary disk, the agitator may consist of other structures, and the agitator may be attached to the lower end of a rotary shaft extended downwardly from the upper portion of the granulating casing coaxially with the rotary shaft of the rotary disk.

One example made by using the granulating and coating machine of the present invention is shown in the following in comparison with comparative examples.

EXAMPLE

A total of 15 kgs of material (12 kgs of acetaminophene; 2.3 kgs of microcrystalline cellulose ("AVISEL ® 101" manufactured by Asahi Chemical Industry Co., Ltd., Japan, under the licence of F.M.C. Corporation, USA), and 0.7 kg if corn starch) were supplied into a granulating and coating machine according to the present invention in which the diameter of the casing was 400 mm, and the height of the casing was 2,000 mm. The rotary disk was rotated at a rotational speed of 200 r.p.m., the agitator was rotated at a speed of 300 r.p.m., and the slit air or slit gas was heated to 80° C. and was fed at the flow rate of 3 Nm$^3$/min. The air through the ventilating portion was also heated to 80° C. and was fed at the flow rate of 5.5 Nm$^3$/min. 4.5 lit. of 8% aqueous solution of hydroxypropyl cellulose ("HPC-SL" manufactured by Nippon Soda Co., Ltd., conforms to the J.P.X) was sprayed for the granulating binder. In this example, the best quality of granulated products which had good particle size distribution and low segregation were obtained, and the granulating and drying operation was finished in as short as 35 minutes.

COMPARATIVE EXAMPLE 1

For comparison, another experiment was performed by using a prior art machine wherein a mesh was provided under the rotary disk on all areas except for the penetration area of the rotary shaft. In this comparative example, the rotary disk was rotated at the rotational speed of 200 r.p.m., and air heated to 80° C. was fed through all areas of the mesh at the flow rate of 8.5 Nm$^3$/min. In this example, however, good granulated products could not be obtained when the total volume of the raw materials was 15 kgs because undesirably large particles were produced. Then, under the same condition, the total volume of the same materials was reduced to 12 kgs. In this example, when 3.6 lit. of 8% solution of hydroxypropyl cellulose, the same quality as used in the above described example 1, was sprayed, for the best granulated products to be obtained, took for the granulation and drying 42 minutes, longer than example 1 by 7 minutes.

COMPARATIVE EXAMPLE 2

For further comparison, another known machine, was used for granulation wherein the bottom was comprised of a rotary disk having no ventilating portion but an annular slit for slit air between the outer periphery of the rotary disk and the inner wall of the casing. The rotary disk was rotated at the rotational speed of 200 r.p.m. The slit air was heated at 80° C. and changed its flow rate in the range of 3 and 8.5 Nm$^3$/min. However, when the total volume of the materials was 15 kgs, satisfactory products could not be granulated at any flow rate of the slit air from 3 to 8.5 Nm$^3$/min because undesirably large particles were produced. Then, the total volume of the materials was reduced to 10 kgs, the rotary disk was rotated at the rotational speed of 200 r.p.m., and the slit air heated up to the temperature of 80° C. was fed at the flow rate of 4.5 Nm$^3$/min. In this comparative example, when 3 lit. of 8% aqueous solution of hydroxypropyl cellulose of the same quality as the example 1 was sprayed, the best granulated products having good particle size distribution and low segregation that could be obtained, was when the granulation and drying were completed in 50 minutes.

The results obtained in these experiments are comparatively shown in Tables 1 and 2.

TABLE 1

| | Charge [Kg/B] | Time [min] | Production capacity per unit time [Kg/min] | *Content of acetaminophene in classified particle size [%] | | | |
|---|---|---|---|---|---|---|---|
| | | | | ~32 mesh | 32~65 mesh | 65~150 mesh | 150~ mesh |
| This invention | 15 | 35 | 0.43 | 101 | 100 | 100 | 99 |
| Comparative example 1 | 12 | 42 | 0.29 | 124 | 109 | 104 | 75 |
| Comparative example 2 | 10 | 50 | 0.20 | 121 | 110 | 88 | 83 |

*Content of acetaminophene [%] = $\frac{\text{analytical value}}{\text{theoretical value}} \times 100$

TABLE 2

| | Bulk density [g/cc] | Particle size distribution [%] | | | | |
|---|---|---|---|---|---|---|
| | | ~32 mesh | 32~48 mesh | 48~65 mesh | 65~100 mesh | 100~150 mesh | 150~ mesh |
| This invention | 0.40 | 1.5 | 8.0 | 64.9 | 18.7 | 6.4 | 0.5 |
| Comparative example 1 | 0.37 | 3.6 | 7.5 | 10.6 | 36.6 | 23.3 | 18.4 |
| Comparative example 2 | 0.38 | 4.3 | 9.2 | 39.9 | 31.4 | 10.5 | 4.7 |

Figure 10:
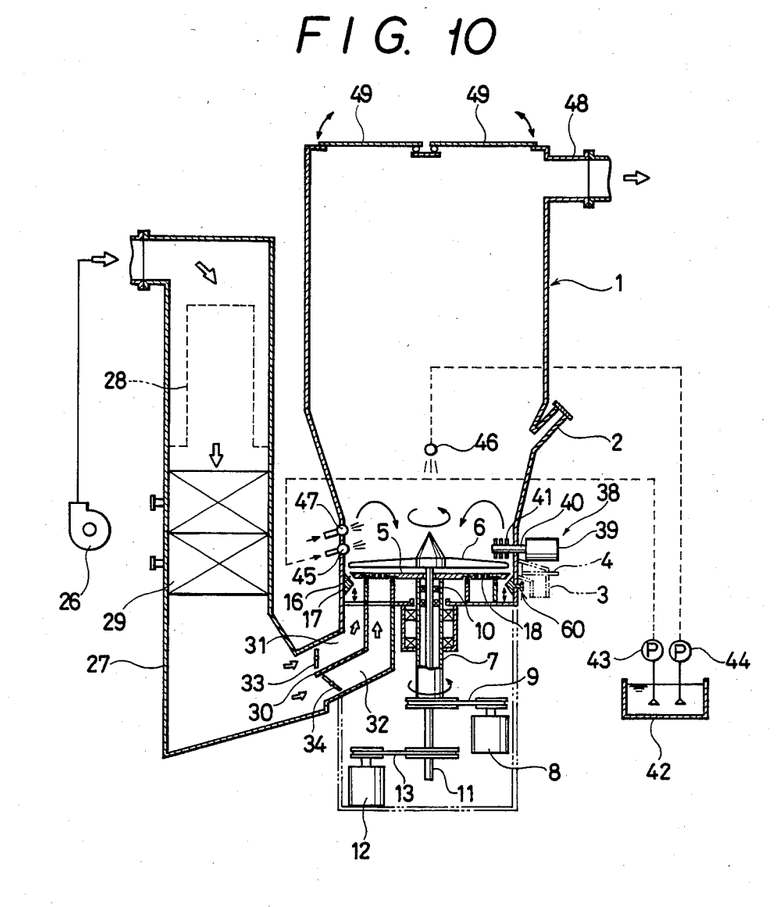
FIG. 10 is a general sectional view of the granulating and coating machine according to yet another embodiment of the present invention.

FIG. 10 is a general sectional view showing another embodiment of the granulating and coating machine in accordance with the present invention.

Because the basic structure of this embodiment is similar to that of the embodiment shown in FIGS. 1 and 2, corresponding parts or portions are shown with the same reference numerals as in FIGS. 1 and 2.

The vertical positions of the rotary disk 5 and the agitator 6 are fixed so as not to move the disk 5 and agitator 6 upwardly and downwardly.

Further, on the inner wall of the casing 1 at a position slightly lower than the outer periphery of the rotary disk 5, there is provided an annular slit forming ring 17 as an annular slit forming means in order to form the annular gap or slit 16 for feeding the slit gas between the ring and the outer periphery of the rotary disk 5. This slit forming ring 17, as apparent in FIG. 11, has a slit forming surface 17a in the form of an inclined or upwardly expanded surface. This slit forming surface 17a is inclined in the same direction as that of a slit forming surface 5a at the outer periphery of the rotary disk 5, of which surface 5a is inclined downwardly to the center of the casing 1. Therefore, both of the slit forming surfaces 5a and 17a are substantially parallel to each other to form the slit 16 between the surfaces 5a and 17a upwardly and outwardly.

Figure 12:
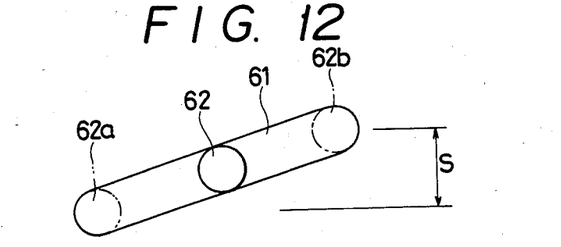
FIG. 12 is a descriptive view showing one embodiment of a slot of a slit adjusting mechanism.

The slit forming ring 17 of this embodiment can adjust the width of the slit 16 for example in the range of 0 to ten-odd millimeters by changing the vertical position of the ring relative to the rotary disk 5. Namely, in this embodiment, the slit forming ring 17 itself is movable upwardly and downwardly by means of a slit adjusting mechanism 60. This slit adjusting mechanism 60 is comprised of a slot 61 (FIG. 12) of a long through hole type formed to the inclined direction through the wall of the casing 1 at the position where the slit forming ring 17 is arranged, a slide shaft 62 is inserted radially through the slot 61 and the inner end thereof is screwed into the slit forming ring 17, and can slide along the longitudinal direction of the slot 61 by the range of stroke S, as shown in FIG. 12, from the phantom line position via the solid line position toward the chain dotted line position. A fixing means or a fixing handle 63, is provided which can be screwed into the outer end of the slide shaft 62 and can contact on the outer surface of the casing 1 at its inner end so as to fix the slide shaft 62 at a desired position along the length of the slot 61.

The slot 61 in this embodiment is formed inclined so that its right side is up as shown in FIG. 12. Therefore, when the slide shaft 62 is in the position shown at 62a in FIG. 12, the slit forming ring 17 is positioned in the lowermost position, and the width or distance of the slit 16 is greatest. On the contrary, the width is the smallest (zero in this embodiment) when the slide shaft 62 is moved to the chain dotted line position as shown at 62b in FIG. 12, where the slit forming ring 17 is brought to the uppermost position, which makes the flow of the slit gas the minimum (the flow of the slit gas is zero or stopped in this embodiment).

As described above, the flow rate of the slit gas, (for example heated or cooled air) blown up into the casing 1 through the slit can always be controlled by adjusting the width of the slit 16, to the optimum rate in correspondence to the step of the granulating or coating operation etc.

Figure 11:
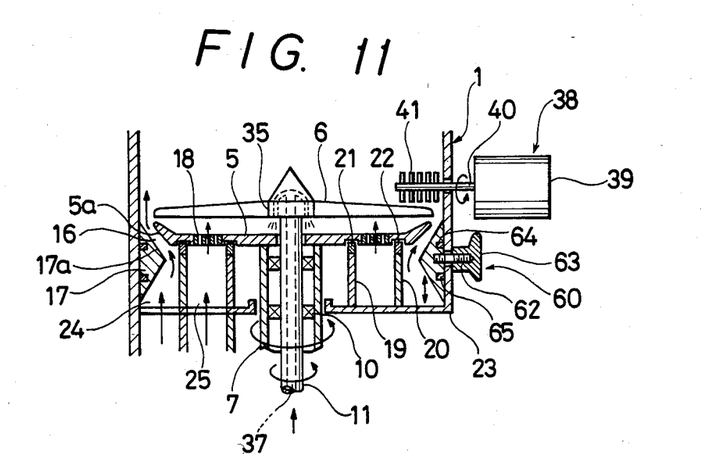
FIG. 11 is an enlarged partial sectional view of the major part of the machine of FIG. 10.

Moreover, the reference numerals 64, 65 in FIG. 11 show respectively the slit forming rings for preventing the outside air from blowing into the casing 1 through the slit 16 and the space between the inner wall surface of the casing 1 and the outer periphery of the slit forming ring 17.

Further, in this embodiment, at a position above the outside area of the agitator 6, there is provided a breaking means or disintegrator 38 arranged horizontally into the casing 1 from the outside thereof.

Figure 13:
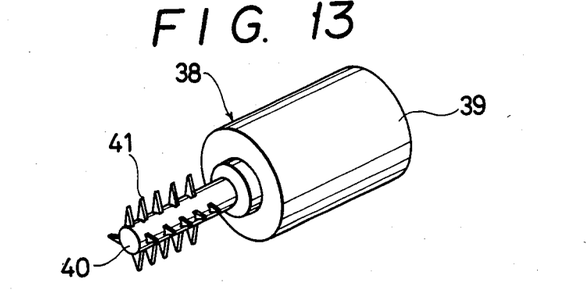
FIG. 13 is a perspective view showing one embodiment of a disintegrator.

As shown in FIG. 13, the disintegrator 38 is comprised of a disintegrating shaft 40 rotatable by an electric or air motor 39, and a plurality of disintegrating blades 41 projected radially outwardly from the outer surface of the shaft 40. These disintegrating blades 41 are rotated in the bed of materials being granulated or coated which are tumbled spirally along the inner wall of the casing 1 by means of the rotations of the rotary disk 5 and the agitator 6. The rotational speed of the blades 41 or shaft 40 is high, for example faster than that of the rotary disk 5 and the agitator 6. As a result, the bed of powdery or granular materials being granulated or coated is given grain size regulation actions, mixing and dispersion, and crushing granulation, in addition to tumbling granulation and coating actions by the rotary disk 5 and agitating, mixing, and kneading actions by the agitator 6. As a result, it becomes possible to obtain smoothly granulated or coated products with high productivity by these multiple actions. In other words, by providing the disintegrating blades 41, granulation or coating may be performed while subdividing the undesirably large particles formed in the bed of powdery or granular materials being granulated or coated into desired particle size by the shearing force of the disintegrating blades 41.

Further, a dust collector such as a bag filter or a cyclone etc. may be provided at the upper area in the casing 1. However, in this embodiment, by providing the disintegrator 38, the granulation or coating can be performed after the powdery or granular materials to be granulated or coated are charged in the casing 1 and binder or coating material is supplied enough to prevent free fine powders from escaping. Therefore, this embodiment has another advantage in that such a dust collector may not necessarily be provided.

The operation of this embodiment is described in the following.

At first, a predetermined volume of the powdery or granular materials to be granulated or coated are fed into the casing 1 via the chute 2.

Next, the gas flow control valve 34 is opened to independently adjust gas flow rate through duct 32 to allow the flow of gas from the feeder fan 26 blown into the casing 1 through the ventilating portion 18 of the rotary disk 5.

Thereafter, the width of the slit 16 is set as desired. Namely, the width of the slit 16 is set to a predetermined distance by loosening, the fixing handle 63 of the slit adjusting mechanism 60 so as to allow the slide shaft 62 to slide to a desired position in the clockwise or counterclockwise direction along the length of the slot 61. Thereby, the slit forming ring 17 is may be slid along the inner wall of the casing 1 together with the slide shaft 62 to adjust or change the width of the slit 16. Thereafter, by rotating the fixing handle 63 on the slide shaft 62 the width of the slit 16 is set at the desired one, After the width of the slit 16 is set to the desired distance, the rotary disk 5 is rotated in the desired direction at the desired speed by rotating the rotary shaft 7 via belt 9 and motor 8. When the granulating operation is started, the gas flow control damper or valve 34 and the slit gas flow control damper or valve 33 are opened to obtain a predetermined gas flow rate in order to blow up the gas from the feeder fan 26 into the casing 1 through the slit 16 and the ventilating portion 18 to prevent the falling down of the raw materials in the casing 1.

The agitator 6 is then rotated by motor 12 via belt 13 and rotary shaft 11 in the same or reverse direction of rotary disk 5 at the desired speed. Then, while a predetermined volume of the powdery or granular materials is fed into the casing 1 through the feeder chute 2 the binder or coating solution is pumped from the tank 42 by the pumps 43, 44 and is sprayed into or onto the bed of the materials by one or both of the spray nozzles 45 or 46.

If required, the required volume of powdery or granular materials may be fed into the bed of the materials from the nozzle 47. The exhaust gas blown up through the bed of materials is discharged out of the system through the exhaust duct 48.

Figure 14:
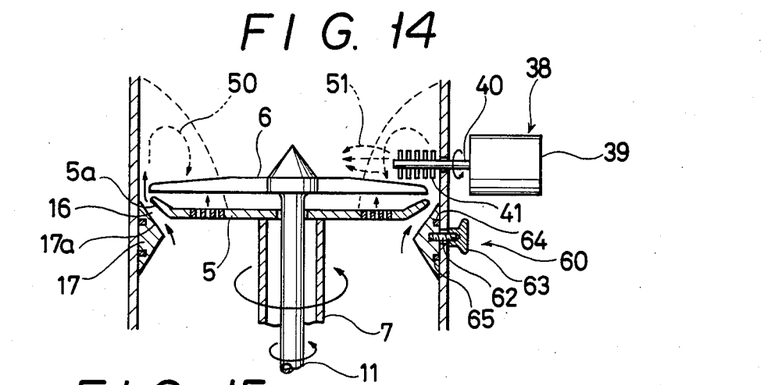
FIGS. 14 and 15 are a partial vertical sectional view and a partial horizontal sectional view respectively, showing granulating and coating action in accordance with the embodiment shown in FIGS. 10–13.
Figure 15:
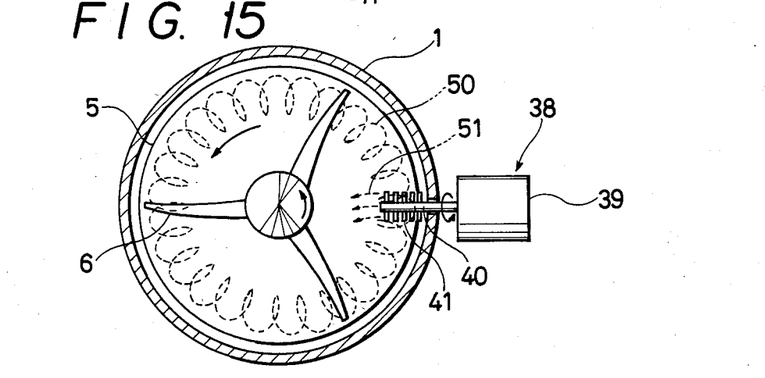

In the above operation, according to the granulating and coating machine in this embodiment, by means of the combined rotational motion of the rotary disk 5 and the agitator 6, and combination of two gas flows consisted of the slit gas flow through the slit 16 and the gas flow through the ventilating portion 18 of the rotary disk 5, the powdery or granular materials are rotated and lifted. As a result, the raw materials are agitated, mixed, tumbled by centrifugal force and fluidized in the circulative flow pattern wherein the materials are blown up by the gas flows and dropped by the gravity. As shown in FIGS. 14 and 15, the powdery or granular materials form a tumbling bed or bed 50 of the materials and move with a spiral, tumbling motion near the inner wall of the casing 1. By rotating the disintegrating blades 41 of the disintegrator 38 in the bed 50, for example, in the same direction as the rotational direction of the materials of the bed 50 (rotational direction of the rotary disk 5) at a rotational speed faster than that of the rotary disk 5, in other words, the tumbling speed of the bed 50, large particles of materials of the bed 50 are subdivided by the rotational shearing force of the disintegrating blades 41 to promote granulation. As shown by a broken line arrow 51 in FIGS. 14 and 15, the materials are dispersed toward the center of the casing 1 in order to obtain better subdivision and mixing actions.

Therefore, according to this embodiment, by subdivision, mixing, dispersion, and particle size regulation actions etc. obtained by means of the disintegrating blades 41 of the disintegrator 38, in addition to the combined rotational motions of the rotary disk 5 and the agitator 6, and combination of the two gas flows consisted of the slit gas fed through the slit 16 and the gas fed through the ventilating portion 18, it is possible to obtain smoothly granulated or coated particles having narrowly dispersed particle size with very high productivity.

In this embodiment, since the vertical position of the slit forming ring 17 is adjusted easily to control the width of the slit 16 to the desired distance the rate of flow of the slit gas blown into the casing 1 through the slit 16 can be controlled to the optimum flow rate in correspondence to any steps or sub-steps of granulation and/or coating, to perform preferable granulating or coating operations by means of the optimum flow rate of slit gas.

In this embodiment, the slit adjusting mechanism 60 is much more simple in structure, much lower in manufacturing cost, and is much more simple and easy in operation than one wherein the rotator is to be moved vertically.

Moreover, according to this embodiment, by providing the disintegrator 38, it is possible to perform granulation or coating by means of mixing and kneading obtained by the rotation of the rotary disk 5, agitator 6 and disintegrating blades 41 in the condition that the binder or coating solution is fed into or onto the powdery or granular materials loaded in the casing 1. As a result, the speed of granulation or coating becomes faster, and scattering of fine powder in the casing 1 is prevented to obtain homogeneous products without segregation of ingredients.

Because the scattering of fine powder, is prevented it may be unnecessary to provide a bag filter in the casing 1. A simple cyclone (not shown) may be provided outside of the casing 1. Thereby a granulating or coating machine of low cost, high efficiency and easy handling (due to the absence of the bag filter), can be obtained.

Further, in case of powdery or granular materials which have high specific gravity, for example, ceramics, powdered metals, or ferrite etc., it is almost impossible to restart fluidization according to prior art, once the fluidized state is broken for some reason. On the contrary, it is possible to restart fluidization in such a case in this embodiment, by rotation of the agitator 6, the disintegrating blades 41 and rotary disk 5 and the air flowing through the slit 16 and the ventilating portion 18 of the disk 5.

Moreover, according to this embodiment, by providing the disintegrator 38, smaller sized particles can be obtained, and by changing the rotational speed of the disintegrating blades 41, the particle size of the products can be controlled easily. Namely, when the rotational speed of the lump breaking blades 41 is low, it is possible to obtain products having relatively large diameter, and when the rotational speed is high, it is possible to obtain fine products.

The products granulated or coated are discharged rapidly from the chute 3 by the combined effect of the rotations of the rotary disk 5 and the agitator 6.

Figure 16:
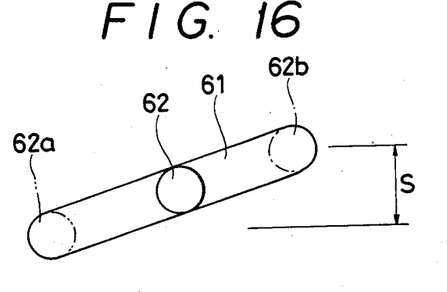
FIG. 16 is a descriptive view of another embodiment of the slot of the slit adjusting mechanism, a FIG. 17 is a descriptive view of the another embodiment of the slot of the slit adjusting mechanism.

A shown in FIG. 16, the slot 61 of the slit adjusting mechanism 60 in another embodiment may be inclined upwardly toward the right in the counterclockwise direction shown in plan view relative to the circumferential direction of the casing 1 similar to that of the embodiment described above. When the slide shaft 62 is in the position shown in a phantom line in the Figure as depicted by the reference numeral 62a, the slit forming ring 17 is moved to the lowest position, and the gap between the slit forming surfaces 5a and 17a become to minimum (in this embodiment, as these surfaces contact with each other, the width of the slit 16 is zero) to minimize (stopped state in this embodiment) the flow of the slit gas into the casing 1. When the slide shaft 62 is in the chain dotted line position depicted by the reference numeral 62b, the slit forming ring 17 is moved to the uppermost position to make the width of the slit 16 maximum. Of course, the direction of inclination of the slot 61 may be changed to the reverse direction relative to that shown in FIGS. 12 and 16.

In the case of this embodiment, the width of the slit 16 can be adjusted simply and easily to the optimum distance by the slit controlling mechanism 60.

Figure 17:
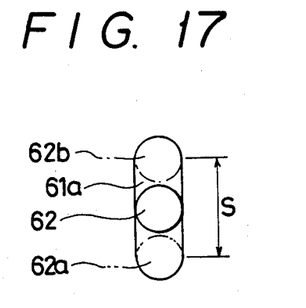

In the embodiment shown in FIG. 17, the slot of the slit adjusting mechanism 60, as depicted by the reference numeral 61a, is comprised of a vertical slot which extends straight in the vertical direction of the granulating casing 1.

Therefore, according to the embodiment of FIG. 17, the lower the position of the slide shaft 62 along the slot 61a is, the smaller the size of the slit 16 to reduce the flow rate of the slit gas into the casing 1. On the contrary, the higher the position of the slide shaft 62 is, the larger the size of the slit 16 to increase the flow rate of the slit gas. The slide shaft 62 can be moved vertically with ease within the range of the stroke S from a position 62b shown in a phantom line in FIG. 17 via the position in a solid line to a position 62b shown in a chain dotted line. The shaft 62 can be fixed in the desired position by the fixing handle 63 of the slit adjusting mechanism.

It is to be understood that the present invention is not limited to the embodiments described in the above and those skilled in the art may be able to devise many other modifications. For example, the slit forming ring and the slit adjusting mechanism etc. can be comprised of constructions other than those described in the above embodiment, and can be fully or partially automated. Further, in place of the rotary disk, a rotary plate having a disk like configuration such as a polygonal plate may be used.

Further, a plurality of slit adjusting mechanism may be provided. And, the slit forming ring may be made by a plate-like ring.

The present invention can be applied to mixing, drying etc. as a unit operation or combined operation with others.

What is claimed is:

1. A granulating and coating machine for use in granulation, coating, mixing, drying and the like of materials, said machine comprising:
   a casing for charging materials to be treated;
   a rotator rotatable substantially horizontally in said casing;
   at least one ventilating portion formed in said rotator;
   an annular member on an inner of wall of said casing near the outer periphery of said rotator;
   an annular slit for feeding slit gas into said casing formed between said annular member and the outer periphery of said rotator;
   slit adjusting means for moving one of said rotator and said annular member to change the width of said slit by changing the distance between said annular member and the periphery of said rotator; and
   a gas flow adjusting mechanism for controlling independently the rate of flow of the gas fed through said ventilating portion and the slit gas fed through said slit.

2. The granulating and coating machine according to claim 1, wherein said gas flow adjusting mechanism consists of a gas passage for feeding the gas fed through said ventilating portion, a slit gas passage for feeding the slit gas fed through said slit, partition means for separating said gas passages with each other, gas flow adjusting means arranged in each of said gas passages.

3. The granulating and coating machine according to claim 2, wherein said gas passages are formed as annular gas passages separated by annular partitions under said rotator.

4. The granulating and coating machine according to claim 1, further comprising an agitator arranged above said rotator and rotatable substantially horizontally, in the direction and at the speed independent from the rotational direction and speed of said rotator.

5. The granulating and coating machine according to claim 4, said agitator is attached to lower end of a rotary shaft extending downwardly from upper portion of said casing coaxially with a rotary shaft of said rotator.

6. The granulating and coating machine according to claim 4, wherein at least one of said rotator and said agitator can be moved in the vertical direction.

7. The granulating and coating machine according to claim 1, wherein said rotator is movable in the vertical direction.

8. The granulating and coating machine according to claim 1, wherein said rotator is movable in the vertical direction, the wall of said casing near the outer periphery of said rotator is expanded to change the width of said slit by the vertical movement of said rotator.

9. The granulating and coating machine according to claim 1, wherein said annular member has a slit forming surface for forming said slit together with a slit forming surface of said rotator.

10. The granulating and coating machine according to claim 1, wherein said slit adjusting means consist of at least one slot formed in the wall of said casing, a shaft inserted through said slot to move along said slot and has an inner end to which said annular member is attached and fixing means mounted on the outer end of said shaft for fixing said annular member at a predetermined position.

11. The granulating and coating machine according to claim 10, wherein said slot is inclined relative to the wall of said casing.

12. The granulating and coating machine according to claim 10, wherein said slot is formed in the vertical direction relative to the wall of said casing.

13. The granulating and coating machine according to claim 1, further comprising a disintegrator for breaking large particles of said powdery or granular materials above said rotator.

* * * * *

UNITED STATES PATENT AND TRADEMARK OFFICE
CERTIFICATE OF CORRECTION

PATENT NO. : 4,556,175

DATED : December 3, 1985

INVENTOR(S) : Shimesu Motoyama, et al.

It is certified that error appears in the above-identified patent and that said Letters Patent is hereby corrected as shown below:

Column 1, line 12, change "way" to --ways--.

Column 1, line 23, change "decade" to --decades--.

Column 1, line 40, delete "balance of" and substitute therefore --balance on--.

Column 2, line 1, delete "nd" and substitute therefore --and--.

Column 2, line 42, after the word "by" delete "and" and substitute therefore --an--.

Column 3, line 39, after the word "of" delete the word --the--.

Column 8, line 51, after the word "surface" delete "if" and substitute therefore --of--.

Column 12, line 48, after "17" delete the word --is--.

Column 12, line 52, after the word "one" delete "," and substitute therefore --.--.

UNITED STATES PATENT AND TRADEMARK OFFICE
CERTIFICATE OF CORRECTION

PATENT NO. : 4,556,175

DATED : December 3, 1985

INVENTOR(S) : Shimesu Motoyama, et al.

It is certified that error appears in the above-identified patent and that said Letters Patent is hereby corrected as shown below:

Column 14, line 32, at the beginning of the paragraph delete the word "A" and substitute therefore --As--.

Column 15, line 16, after the word "adjusting" change "mechanism" to --mechanisms--.

Signed and Sealed this

Sixteenth Day of September 1986

[SEAL]

Attest:

Attesting Officer

DONALD J. QUIGG

Commissioner of Patents and Trademarks